Jan. 5, 1971    J. L. MANNING    3,552,839
SPECTACLES WITH CHEEKBONE ENGAGING OFFSET PADDED ARMS
Filed Dec. 30, 1968
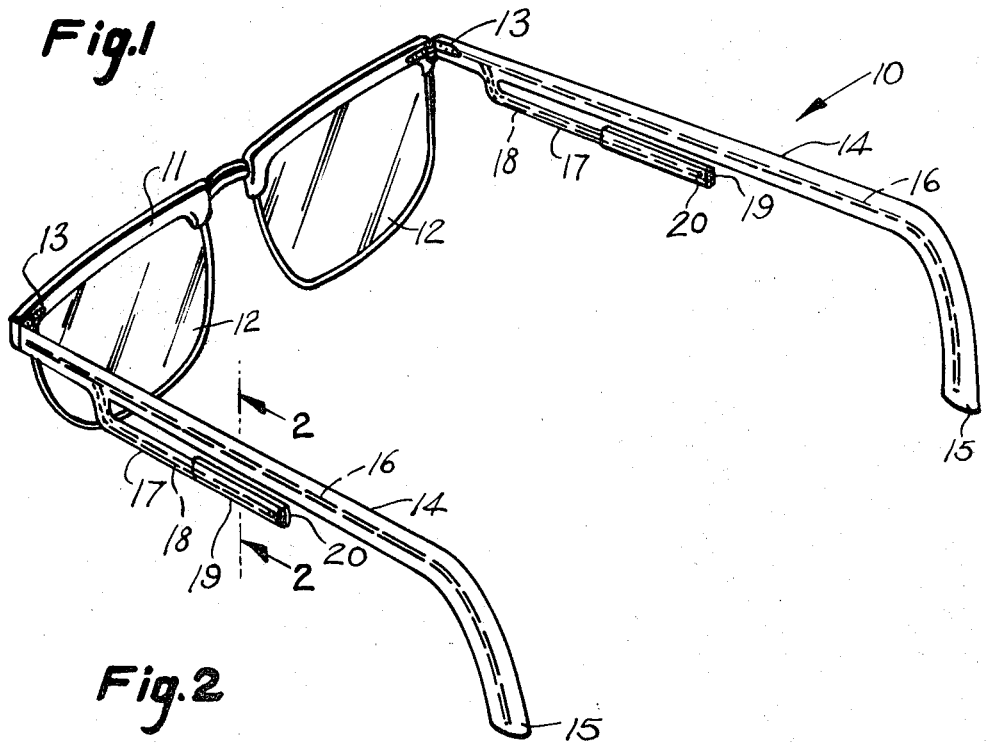
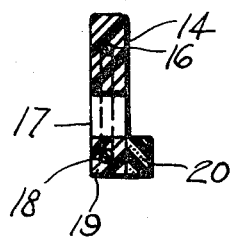
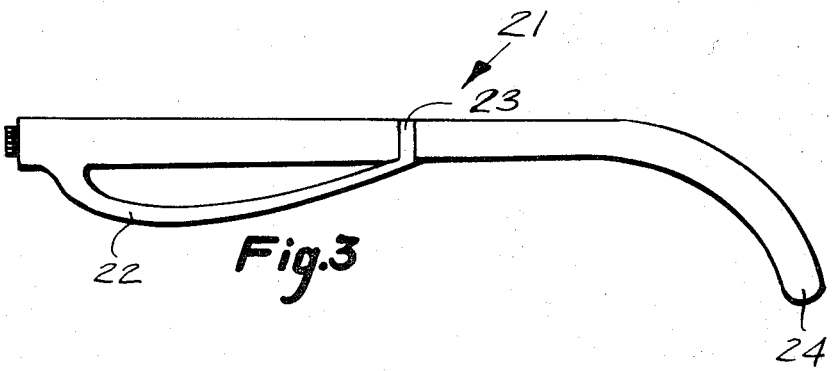
INVENTOR.
James Leslie Manning

United States Patent Office 3,552,839
Patented Jan. 5, 1971

3,552,839
SPECTACLES WITH CHEEKBONE ENGAGING OFFSET PADDED ARMS
James Leslie Manning, 1348 Madison St., Denver, Colo. 80206
Filed Dec. 30, 1968, Ser. No. 787,883
Int. Cl. G02c 5/18
U.S. Cl. 351—123          1 Claim

ABSTRACT OF THE DISCLOSURE

An eye glass frame having the side frame portion equipped with an offset arm which is cushioned and adjustable in order to keep pressure off the nose of the wearer.

This invention relates to eye glasses and more particularly to an improved flexible frame.

It is therefore the main purpose of this invention to provide a pair of spectacles which will have the side frames provided with an elongated offset arm, the arm serving to reduce the weight of the glasses upon the bridge of the nose of the wearer.

Another object of this invention is to provide spectacle frames which will have the offset arm extending around the cheekbone and may be adjusted inwards.

Still a further object of this invention is to provide a spectacle frame which will have disposible tubular members with an attached foam rubber pad which may be removed from the offset arm and replaced when desired, and the foam rubber pad attached to the tube provides a comfortable rest on the cheekbone area of the face of the wearer while the offset arm tends to lift the nose piece off the nose of the wearer, thus relieving pressure on the nose and preventing irritation and possible infection.

Other objects of this invention are to provide spectacle frames which are simple in design, inexpensive to manufatcure, rugged in construction, easy to use and efficient in operation.

These and other objects will become readily apparent upon a study of the following specification together with the accompanying drawing wherein:

FIG. 1 is a perspective view of the present invention;

FIG. 2 is an enlarged cross-sectional view taken along the lines 2—2 of FIG. 1; and FIG. 3 is a side view of a modified form of the present invention shown in elevation.

According to this invention, a pair of spectacles 10 are shown to include a glass carrying frame 11 having lenses 12 attached thereto. A pair of hinges 13 are attached to the end of frame 11 and secured to the sides of plastic side frames 14 having acuate ends 15. Side frames 14 are moulded around wire 16 from which extends an offset arm 17 also of plastic. Offset arm 17 is composed of a wire 18 extending from the side frame 14 and provides a means of forcing the weight of spectacles 10 from the temple and cheekbone area of the face of the wearer.

Tube 19 is slideable onto the extending portion of wire 18 which is not covered with plastic and to tube 19 is fixedly secured a foam rubber pad 20 which provides comfort to the wearer as the offset arm 17 transfers the weight of the spectacles 10 from the nosepiece of spectacles 10, to the face of the wearer.

It will be noted that the plastic tube 19 and its associated foam rubber pad 20 is disposable and when worn for a length of time may be replaced by a similar one.

It shall further be noted that the purpose of the offset arm 17 of side frame 14 is to relieve the pressure on the nose caused by the weight of spectacles 10. This weight causes a tremendous amount of pain and misery and in instances creates an infection where the spectacles press against the nose of the wearer. This pressure is released from the nose by the offset arm 17 which is adjustable inwards and extends rearward towards the end of side frame in order that the foam rubber pads 20 will rest comfortably on the temple.

Looking now at FIG. 3 of the drawings, one will see a modified form of side frame 21 including an offset arcuate member 22 which extends from the forward end of side frame 21 and arcuately curves upwards at the temple area. The offset member 22 is provided with a band 23 at its smaller end which embraces the side frame 21 towards the rear end 24.

What I now claim is:

1. A pair of spectacles comprising a lens carrying frame, a pair of plastic side frames, and off-set arm means carried by said spectacles for transferring the weight from the nose of the wearer to the cheekbone area of said wearer, a pair of disposable and padded tubes carried by said spectacles so to cushion said spectacles against said cheekbone area of said wearer, said side frames of said spectacles each including an off-set arm depending downwardly and rearwardly from said spectacles, said arm comprising a plastic covering over a wire extension which at one end thereof is secured to a central wire embedded within a plastic covering forming said side frame, said arm receiving a disposable plastic tube and a foam rubber pad slideably mounted on the end of said arm for adjustment position against said cheekbone of said wearer, said disposable plastic tubes being adhered to said foam rubber pads, and said tubes being slideable upon an exposed end of said wire extension extending from said plastic covering of said arm, and said foam rubber pads being received against said cheekbone area.

References Cited

UNITED STATES PATENTS 2,280,666  4/1942  Schofield _____ 351—123
2,294,840  9/1942  Dunn _____ 351—123

FOREIGN PATENTS 524,366  8/1940  Great Britain _____ 351—123

DAVID H. RUBIN, Primary Examiner

U.S. Cl. X.R.
351—117